March 22, 1932. J. W. PAGE 1,850,767
SPREADER
Filed Dec. 27, 1930 2 Sheets-Sheet 1
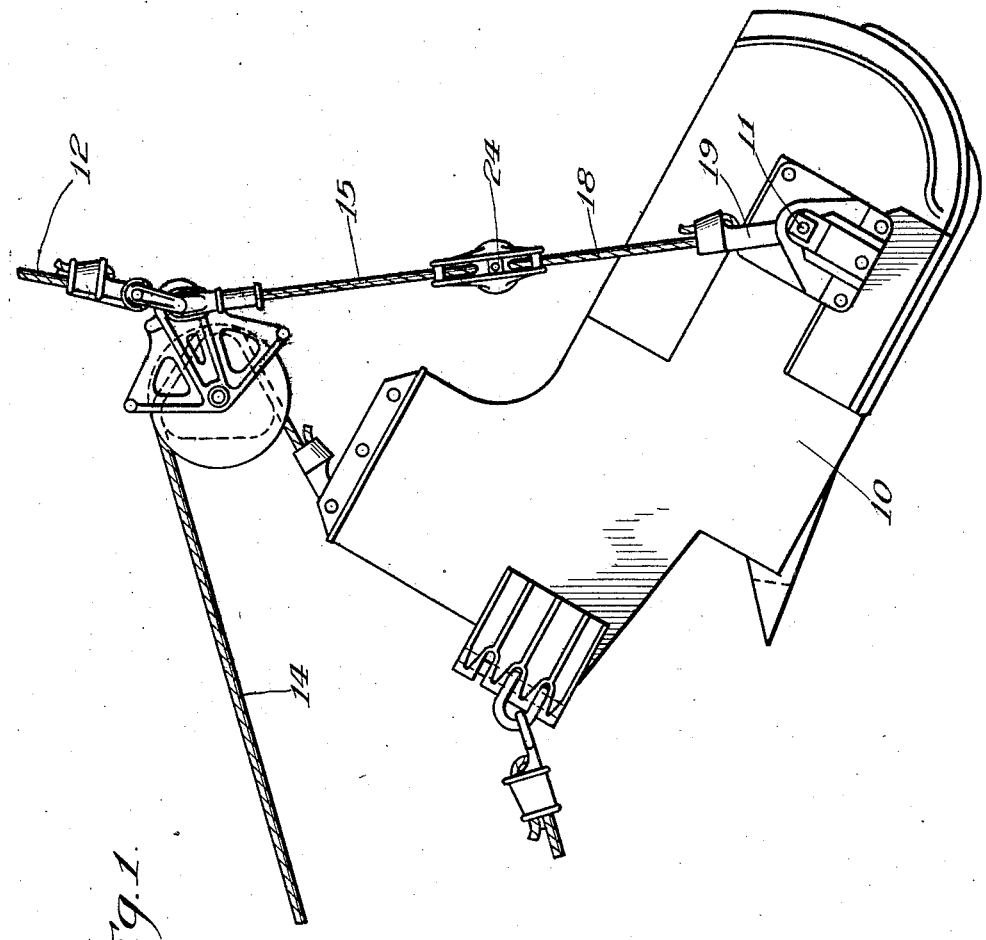
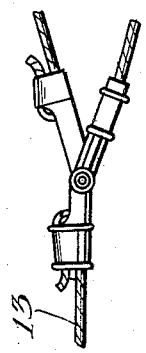
Inventor:
John W. Page,
By
Dyrenforth, Lee, Chritton & Wiles
Attys.

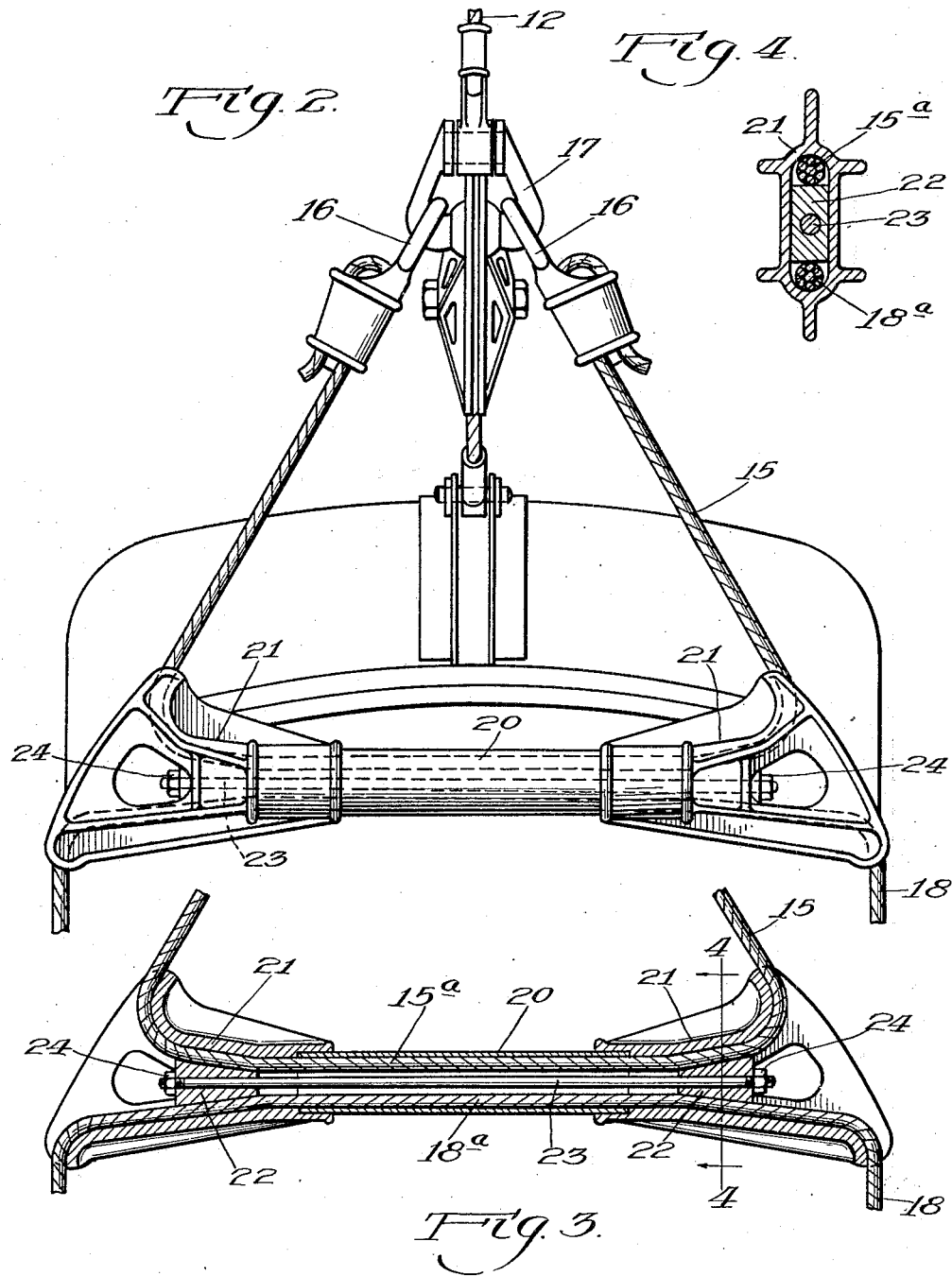

Patented Mar. 22, 1932

1,850,767

UNITED STATES PATENT OFFICE

JOHN W. PAGE, OF CHICAGO, ILLINOIS

SPREADER

Application filed December 27, 1930. Serial No. 505,184.

This invention relates to improvements in spreaders and, more especially, such a device particularly adapted for use in the construction of a bail support out of cables.

Purely for the purpose of illustration, I have shown my improved spreader used in connection with the bail support on an excavating bucket of the Page type. It is to be understood, however, that the invention is capable of many other uses.

Among the features of my invention is the provision of a device permitting the formation of a bail support from separate pieces of cable. The device is so formed that the two ends of the bail may be easily equalized even after the entire bail is attached to the bucket and lifting means. This adjustment may be obtained also even though the two lengths of cable used are unequal. By the use of my invention, it is also possible to readily equalize the two sides of the bail at any time in the event any unevenness should occur by unequal stretching of portions of the cable. This equalizing can be accomplished by loosening the ends of the bail.

Other features and advantages of my invention will appear more fully as I proceed with my specification.

In that form of device embodying the features of my invention shown in the accompanying drawings—

Figure 1 is a view in side elevation of my improved device, showing the same in use on an excavating bucket of the type referred to; Fig. 2 is a view in front elevation; Fig. 3 is a vertical sectional view; and Fig. 4 is a view taken as indicated by the line 4—4 of Fig. 3.

As shown in the drawings, 10 may indicate an excavating bucket pivotally supported at 11, 11 by a suitable bail from the lifting line 12. Numeral 13 may indicate the usual hauling line, and 14, the holding line controlling the dumping of the bucket.

For the purpose of illustration, my invention is here shown as embodied in a spreader used to form the bail support between the lifting line 12 and the bucket 10 at the points 11, 11. To form this bail construction, I provide an upper piece of cable 15 with its upper ends attached by means of the connectors 16 to the yoke 17 carried on the lower end of the lifting line 12. I also provided a lower piece of cable 18 with its lower ends attached to the cable connectors 19 pivotally attached to the bucket at 11. It will be seen, therefore, that with two pieces of cable 15 and 18 having their ends connected as just described, all that is necessary further to make the bail construction is to provide means for holding the two opposed bights of the cable in spread position and means for locking the bights against longitudinal movement with respect to the spreader. If the two bights are held by a spreader in spread position, the two sides of the bail may be easily equalized at any time by merely shifting one or both of the bights in the spreader until the bail is symmetrical. When the equalization is obtained, the bights must be locked against further longitudinal movement.

As here shown, my spreader includes a tubular member 20 with flared ends 21, 21. This tubular member is large enough for the bights 15ª and 18ª of the two cables 15 and 18, respectively, to pass therethrough. These bights may be shifted longitudinally in the spreader, as desired, to equalize the two sides of the bail. When the bail is equalized, the bights are locked against further longitudinal movement. This locking is accomplished by the provision of wedge members 22, 22 lying in the flared ends 21, 21 between the bights of the cables. These wedge members are adapted to be drawn together by a rod 23 passing through the same, having threaded ends with nuts 24 thereon. Tightening of the nuts pulls the wedges toward each other to clamp or lock the cables in the flared portions 21, 21.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A device of the character described including, a tubular member with flared ends of sufficient size to permit the passage therethrough of two opposed bights of cable, and means for locking the bights of cable against longitudinal movement in said tubular member.

2. A device of the character described including, a tubular member with flared ends of sufficient size to permit the passage therethrough of two opposed bights of cable, and releasable means for locking the bights of cable against longitudinal movement in said tubular member.

3. A device as claimed in claim 1, in which the locking means includes a wedge member in one of the flared ends with means for forcing said wedge member inwardly to grip the bights of cable against the wall of said flared end.

4. A device as claimed in claim 2, in which the locking means includes a wedge member in one of the flared ends with means for forcing said wedge member inwardly to grip the bights of cable against the wall of said flared end.

5. A device as claimed in claim 1, in which the locking means includes a wedge member in each of the flared ends with means for drawing said wedge members inwardly to lock the bights of cable between said wedge members and the walls of said flared ends.

6. A device as claimed in claim 2, in which the locking means includes a wedge member in each of the flared ends with means for drawing said wedge members inwardly to lock the bights of cable between said wedge members and the walls of said flared ends.

7. A device as claimed in claim 1, in which the locking means includes a wedge member in each of the flared ends connected by a rod with means for shortening the rod to draw the wedge members inwardly to lock the bights of cable between said wedge members and the wall of said flared ends.

8. A device as claimed in claim 2, in which the locking means includes a wedge member in each of the flared ends connected by a rod with means for shortening the rod to draw the wedge members inwardly to lock the bights of cable between said wedge members and the wall of said flared ends.

In witness whereof, I have hereunto set my hand this 18th day of December, A. D. 1930.

JOHN W. PAGE.